(12) United States Patent
Onggosanusi et al.

(10) Patent No.: US 7,668,564 B2
(45) Date of Patent: Feb. 23, 2010

(54) SLOW UPLINK POWER CONTROL

(75) Inventors: Eko N. Onggosanusi, Allen, TX (US);
Timothy A. Schmidl, Dallas, TX (US);
Aris Papasakellariou, Dallas, TX (US);
Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 512 days.

(21) Appl. No.: 11/425,202

(22) Filed: Jun. 20, 2006

(65) Prior Publication Data

US 2006/0286995 A1 Dec. 21, 2006

Related U.S. Application Data

(60) Provisional application No. 60/692,154, filed on Jun. 20, 2005.

(51) Int. Cl.
*H04B 7/00* (2006.01)
(52) U.S. Cl. .......................... 455/522; 455/69; 370/318
(58) Field of Classification Search .................. 455/69, 455/522; 370/318
See application file for complete search history.

(56) References Cited

U.S. PATENT DOCUMENTS

| 6,188,903 | B1 * | 2/2001 | Gardner et al. .............. 455/447 |
| 6,564,067 | B1 * | 5/2003 | Agin .......................... 455/522 |
| 6,600,773 | B2 | 7/2003 | Zeira |
| 6,606,343 | B2 | 8/2003 | Zeira |
| 6,831,913 | B1 | 12/2004 | Vialen |
| 6,845,122 | B2 | 1/2005 | Zeira |
| 6,967,970 | B2 * | 11/2005 | Terry et al. ................... 370/458 |
| 6,996,195 | B2 | 2/2006 | Kadous |
| 7,117,003 | B2 * | 10/2006 | Kayama et al. .............. 455/522 |
| 7,239,622 | B2 * | 7/2007 | Black .......................... 370/338 |
| 2002/0115464 | A1 * | 8/2002 | Hwang et al. ............... 455/522 |
| 2002/0145988 | A1 | 10/2002 | Dahlman |
| 2004/0116111 | A1 | 6/2004 | Saunders |
| 2005/0201281 | A1 * | 9/2005 | Damnjanovic et al. ...... 370/230 |
| 2006/0018297 | A1 | 1/2006 | Gorokhov |
| 2006/0034226 | A1 | 2/2006 | Go et al. |
| 2006/0255989 | A1 * | 11/2006 | Kim et al. ................... 341/120 |

FOREIGN PATENT DOCUMENTS

| WO | WO03077452 | 9/2003 |
| WO | WO2006018481 | 2/2006 |

OTHER PUBLICATIONS

"Introduction to WiBro Technology", Sep. 10, 2004.*

* cited by examiner

*Primary Examiner*—Raymond S Dean
(74) *Attorney, Agent, or Firm*—Steven A. Shaw; W. James Brady; Frederick J. Telecky, Jr.

(57) ABSTRACT

Embodiments of the invention provide embodiments of the invention provide and method, network entity and user equipment for slow uplink power control of user equipment in a wireless communication system by responding to a long term control metric that is derived from an uplink channel metric over a plurality of transmission instances and a set of performance criteria. A method for slow uplink power control in accordance with and embodiment of the invention measures at least one uplink channel metric for user equipment and then determines an appropriate transmit power for the user equipment by using a control metric derived from the uplink channel metric corresponding to a plurality of transmission instances for the user equipment.

16 Claims, 2 Drawing Sheets

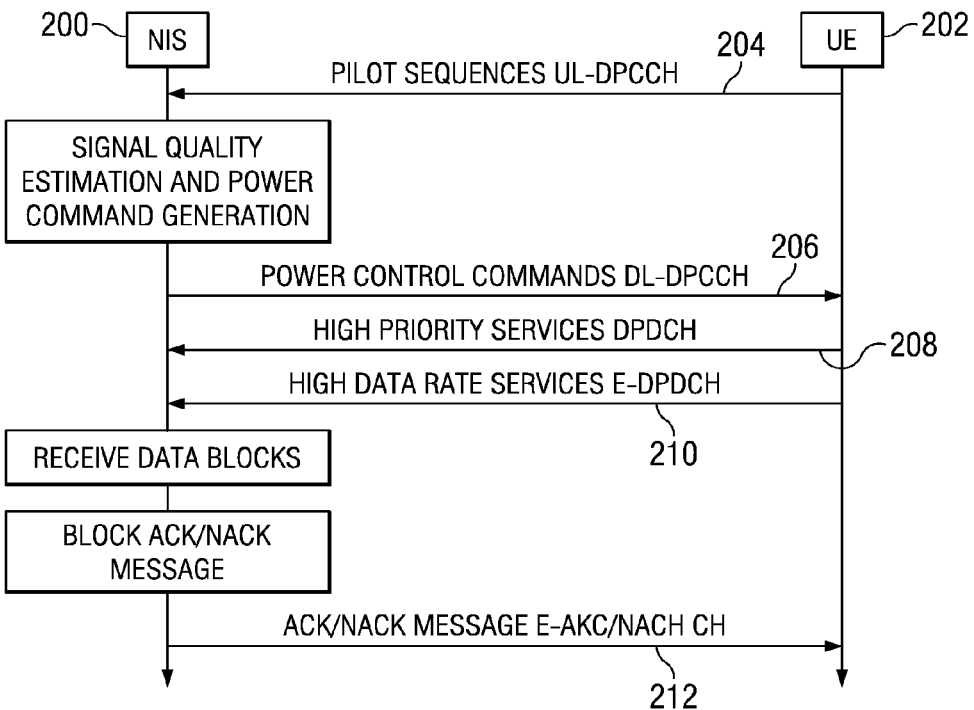
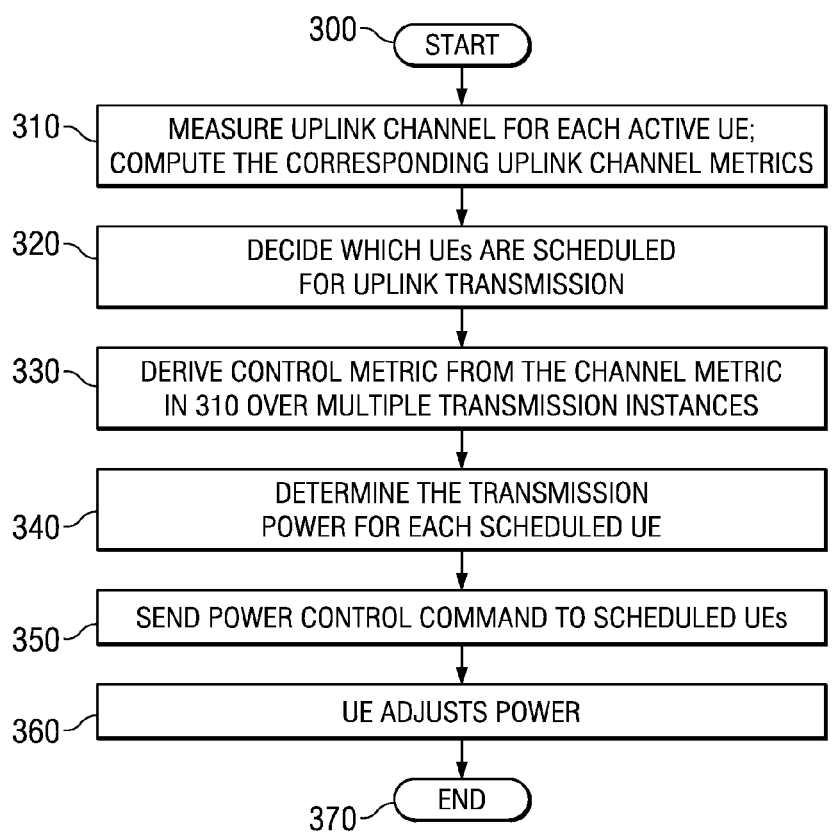

SLOW UPLINK POWER CONTROL

CLAIM OF PRIORITY UNDER 35 U.S.C. §119

The present Application for Patent claims priority to U.S. Provisional Application No. 60/692,154 entitled "Slow Uplink Power Control" filed Jun. 20, 2005. Said application assigned to the assignee hereof and hereby incorporated by reference.

BACKGROUND

The invention relates generally to communication systems. More particularly, embodiments of the invention relate to controlling radio resources in a communication system.

High Speed Uplink Packet Access (HSUPA) is a packet-based data service of Universal Mobile Telecommunication Services (UMTS) with typical data transmission capacity of a few megabits per second, thus enabling the use of symmetric high-speed data services, such as video conferencing, between user equipment and a network infrastructure.

An uplink data transfer mechanism in the HSUPA is provided by physical HSUPA channels, such as an Enhanced Dedicated Physical Data Channel (E-DPDCH), implemented on top of Wideband Code Division Multiple Access (WCDMA) uplink physical data channels such as a Dedicated Physical Control Channel (DPCCH) and a Dedicated Physical Data Channel (DPDCH), thus sharing radio resources, such as power resources, with the WCDMA uplink physical data channels. The sharing of the radio resources results in inflexibility in radio resource allocation to the physical HSUPA channels and the WCDMA physical data channels. In CDMA, which is a non-orthogonal multiple access scheme, the signals from different users within the same cell interfere with one another. This type of interference is known as the intra-cell interference. In addition, the base station also receives the interference from the users transmitting in neighboring cells. This is known as the inter-cell interference.

Uplink power control is typically intended to control the received signal power from the active user equipments (UEs) to the base as well as the rise-over-thermal (RoT), which is a measure of the total interference (intra- and inter-cell) relative to the thermal noise. In systems such as HSUPA, fast power control is required due to the fast fluctuation in multi-user (intra-cell) interference. This fast fluctuation will otherwise result in the well-known near-far problem. Moreover, as uplink transmission in an HSUPA system is not orthogonal, the signal from each transmitting UE is subject to interference from another transmitting UE. If the signal strength of UEs varies substantially, a stronger UE (for example, a UE in favorable channel conditions experiencing a power boost due to constructive short term channel fading such as Rayleigh fading) may completely overwhelm the signal of a weaker UE (with signal experiencing attenuation due to short term fading). To mitigate this problem, fast power control has been considered previously in the art where fast power control commands are transmitted from a base station to each UE to set the power of uplink transmission. As the objective of these power control commands is to combat short term channel fading for typical UE speeds and carrier frequencies in the order of 1 GHz, their transmission rate is in the order of 1 millisecond. This is also typically the order of a transmission time interval. In addition to this fast power control (a.k.a. inner loop power control), a slow power control (a.k.a. outer loop power control) to ensure that each of the user dedicated channels and other uplink control channels have sufficient Ec/Nt (chip SNR) for demodulation (see TR25.896 of 3rd Generation Partnership Project (3GPP) for HSUPA).

When an orthogonal multiple access scheme such as Single-Carrier Frequency Division Multiple Access (SC-FDMA)—which includes interleaved and localized Frequency Division Multiple Access (FDMA) or Orthogonal Frequency Division Multiple Access (OFDMA)—is used; multi-user interference is not present for low mobility and small for moderate mobility. This is the case for the next generation UMTS enhanced-UTRA (E-UTRA) system—which employs SC-FDMA—as well as IEEE 802.16e also known as Worldwide Interoperability for Microwave Access (WiMAX)—which employs OFDMA, In this case, the fluctuation in the total interference only comes from inter-cell interference and thermal noise which tends to be slower. While fast power control can be utilized, it can be argued that its advantage is minimal. Hence, only slow power control is needed for orthogonal multiple access schemes.

SUMMARY

In light of the foregoing background, embodiments of the invention provide a method, network entity and user equipment for slow uplink power control of user equipment in a wireless communication system by responding to a long term control metric that is derived from an uplink channel metric over a plurality of transmission instances and a set of performance criteria. A method for slow uplink power control in accordance with and embodiment of the invention measures at least one uplink channel metric for user equipment and then determines an appropriate transmit power for the user equipment by using a control metric derived from the uplink channel metric corresponding to a plurality of transmission instances for the user equipment.

Therefore, the system and method of embodiments of the present invention provide additional advantages to prior techniques while avoiding corresponding aspects that are not necessary in a communication system where multiple transmissions are substantially orthogonal to each other.

BRIEF DESCRIPTION OF THE DRAWINGS

Figure 1:
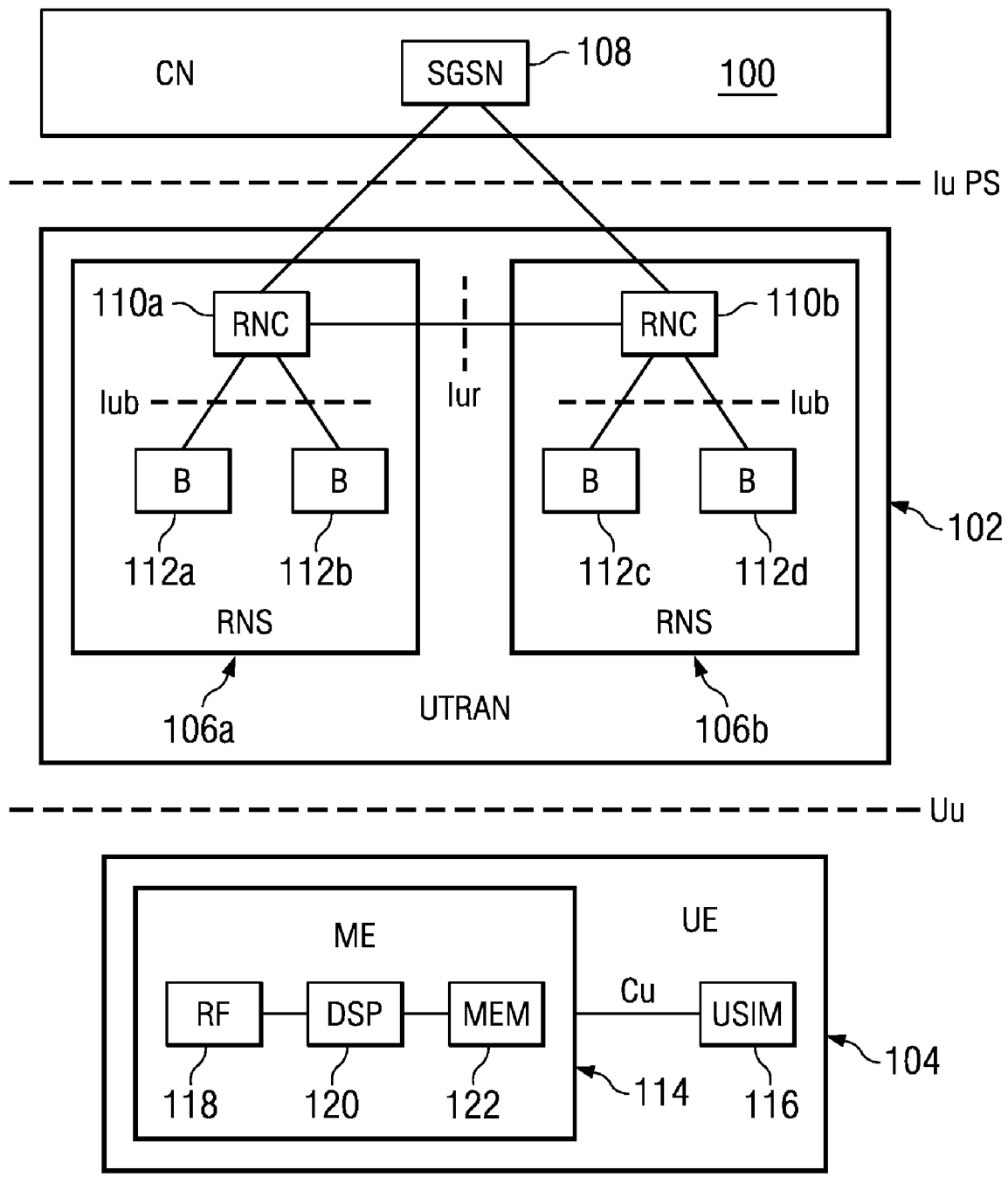

Having thus described the invention in general terms, the invention will be described in greater detail with reference to the embodiments and the accompanying drawings, and wherein:

FIG. 1 shows a first example of a wireless telecommunications system;

FIG. 2 shows an example of an HSUPA channel structure and an HSUPA protocol; and FIG. 3 is a flowchart presenting a method in accordance with an embodiment of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art FIG. 1 illustrates an example of a network architecture of a wireless telecommunications system to which the present solution may be applied. Below, embodiments of the invention will be described using the Universal Mobile Telecommunications System (UMTS) as an example of the wireless telecommunications system. The invention may, however, be applied to any wireless telecommunications system that supports HSUPA protocol elements, such as Hybrid Automatic Retransmission Request (HARQ) and Adaptive Modulation and Coding (AMC). At the same time, different network architecture is envisioned for the next generation systems such as the UMTS E-UTRA which is a full-IP based network. In that case, the network architecture will be greatly simplified compared to what is depicted in FIG. 1. The structure and the functions of such a wireless telecommunications system and those of the associated network elements are only described when relevant to the invention.

The wireless telecommunications system may be divided into a core network (CN) 100, a UMTS terrestrial radio access network (UTRAN) 102, and user equipment (UE) 104. The core network 100 and the UTRAN 102 compose a network infrastructure of the wireless telecommunications system.

The UTRAN 102 is typically implemented with wideband code division multiple access (WCDMA) radio access technology.

The core network 100 includes a serving GPRS support node (SGSN) 108 connected to the UTRAN 102 over an Iu PS interface. The SGSN 108 represents the center point of the packet-switched domain of the core network 100. The main task of the SGSN 108 is to transmit packets to the user equipment 104 and to receive packets from the user equipment 104 by using the UTRAN 102. The SGSN 108 may contain subscriber and location information related to the user equipment 104. Note that since this is a legacy from GPRS, it may not be needed in the next generation UMTS system.

The UTRAN 102 includes radio network sub-systems (RNS) 106A, 106B, each of which includes at least one radio network controller (RNC) 110A, 110B and nodes B also referred to as base station 112A, 112B, 112C, 112D. In the next generation full-IP network, the role of RNC will be deemphasized since most of its functionalities are moved to the base stations. It will be replaced by either an "RNC-Lite" or it will be removed and have its functionality performed at the base station (Node B) level.

Some functions of the radio network controller 110A, 110B may be implemented with a digital signal processor, memory, and computer programs for executing computer processes. The basic structure and the operation of the radio network controller 110A, 110B are known to one skilled in the art and only the details relevant to the present solution are discussed in detail.

The node B 112A, 112B, 112C, 112D implements the Uu interface, through which the user equipment 104 may access the network infrastructure. Some functions of the base station 112A, 112B, 112C, 112D may be implemented with a digital signal processor, memory, and computer programs for executing computer processes.

The basic structure and operation of the base station 112A, 112B, 112C, 112D are known to one skilled in the art and only the details relevant to the present solution are discussed in detail. The user equipment 104 may include two parts: mobile equipment (ME) also know as mobile stations in the art 114 and a UMTS subscriber identity module (USIM) 116. The mobile equipment 114 typically includes radio frequency parts (RF) 118 for providing the Uu interface.

The user equipment 104 further includes a digital signal processor 120, memory 122, and computer programs for executing computer processes. The user equipment 104 may further comprise an antenna, an RF components adapted to adjust the transmission power in response to a slow power control command generated in accordance with embodiments of the invention, a user interface, and a battery not shown in FIG. 1.

User equipment implemented in accordance with embodiments of the invention is capable of receiving a slow power control command at a rate substantially smaller than the transmission time interval rate. The transmission time interval rate may be in the order of a millisecond and the power control update rate may be in the order of tens/hundreds of milliseconds or slower.

The USIM 116 comprises user-related information and information related to information security in particular, for instance an encryption algorithm.

The basic structure and operation of the user equipment 104 are known to one skilled in the art and only the details relevant to the present solution are discussed in detail.

FIG. 2 illustrates an example of physical channels and procedures associated with the HSUPA protocol. This is given for informative purpose as the next generation UMTS system employs a significantly different link model and it is not built on top of WCDMA. However, some of the functionalities depicted in FIG. 2 that are exclusively related to HSUPA still remain relevant for the next generation system. The network infrastructure (NIS) is presented by vertical axis 200 and the user equipment is presented by vertical axis 202.

An uplink control channel, such as an uplink DPCCH (Dedicated Physical Control Channel) defined in the 3GPP ($3^{rd}$ Generation Partnership Project) specification, transmitted by the user equipment 200 includes pilot sequences. The network infrastructure 200 receives the pilot sequences and estimates signal quality parameters, such as SIR (Signal-to-Interference Ratio), of the uplink DPCCH 204. Similar pilot channels are also included in other technologies for uplink transmission, such as ones based on SC-FDMA or OFDMA, as the pilot channel is typically needed for several receiver functionalities, such as for example, channel estimation, time and frequency tracking, and so on.

The network infrastructure 200 generates slow power control commands on the basis of the signal quality parameters and transmits the slow power control commands to the user equipment 202 over a downlink control channel 206, such as a downlink DPCCH. The slow power control commands may be associated with an inner loop of a closed-loop power control protocol, for example, which is the case for HSUPA.

The user equipment 202 may be connected to the network infrastructure 200 over an uplink physical data channel 208, such as a DPDCH (Dedicated Physical Data channel) defined in the 3GPP specification. The uplink physical data channel 208 represents a conventional data channel that as such excludes the use of the HSUPA protocol. The uplink physical data channel 208 is typically used for high priority services, such as conversational class speech services and RRC (Radio Resource Controller), in relation to the HSUPA data transfer capacity. High data rate packet services in the uplink are provided by a physical HSUPA channel 210, such as an E-DPDCH (Enhanced Dedicated Physical Data Channel) defined in the 3GPP specification. The E-DPDCH transfers data blocks in predetermined temporal intervals, such as a TTI (Transmission Time Interval). Each data block is received, and a CRC (Cyclic Redundancy Check) procedure, for example, is used to test the success of the reception of the block.

A block acknowledgement message is generated for each data block on the basis of the test. If the data block was received successfully, the block acknowledgement message indicates "acknowledgement (ACK)". If the data block was received unsuccessfully, the block acknowledgement message indicates "non-acknowledgement (NACK)".

The block acknowledgement message is transmitted from the infrastructure 200 over an HSUPA acknowledgement message channel 212. The uplink physical data channel 208 and the physical HSUPA channel 210 are parallel code channels each typically having different channel codes.

Embodiments of the invention disclose methods of slow uplink power control for systems that employ orthogonal multiple access schemes. As mentioned above, the purpose of slow power control in HSUPA is to ensure sufficient Ec/Nt (long term average received SNR) for demodulation. For the disclosed methods and the associated embodiments, in addition to ensuring sufficient Ec/Nt, the slow power control scheme is also used to control the amount of inter-cell interference that is experienced by all the cells. Hence, the slow power control scheme is essentially a function of long term channel statistics such as the shadowing and path losses. That is, the slow power control directly or indirectly adapts to changes in those long term channel statistics. Several schemes to obtain some measurements of those statistics will be disclosed.

FIG. 3 is a flowchart presenting a method in accordance with an embodiment of the invention. The method starts at 300. A network entity, Node B or a base station for example, measures the uplink channel for each of the active UEs at 310. This is done via channel estimation, which gives an estimate of the instantaneous uplink channel. From this estimate, the base station derives and uses a particular metric to decide which UEs are scheduled for uplink transmission, 320. Examples of such metric is the channel quality indicator (CQI) or SINR or channel energy or simply the instantaneous received power. Also, non-channel dependent aspects such as the HARQ buffer status for each UE, the latency requirements for the transmission from each UE, the type of communication (for example, file download or interactive), and so on, may also be considered. A scheduler that incorporates a fairness criterion may be used.

Referring now to 330, the instantaneous uplink channel metric is averaged over multiple transmission instances (e.g. symbols, TTIs, sub-frames, frames) to obtain a control metric for slow power control. The averaging length is chosen such that this metric reflects the long term channel conditions such as shadowing and path losses. Different averaging techniques may be used. Some examples are uniform vs. weighted averaging, one-sided vs. two-sided averaging, or a more general type of filtering. A more general embodiment is to derive the long-term control metric from a function of the instantaneous metrics and the stored previous metrics.

Based upon the control metric, the base station determines the appropriate UE transmit power for the scheduled UEs using one or more criteria at 340. As mentioned above, the criteria may be chosen to ensure sufficient Ec/Nt and at the same time controlling the amount of inter-cell interference. Another example is to classify UEs according to criteria such as guaranteed quality of service (QoS) or allowed throughput and modify the transmit power accordingly. In general, the criteria may be modified during the system operation depending on the need. Furthermore, the base station may use different criteria for different UEs. For example, the UEs in the handover state may be assigned different criteria from those that are not. Also, it may be more efficient for the UEs that are close to the base station to be assigned different criteria from those that are on the cell edges.

To control inter-cell interference, numerous methods can be used and categorized into several classes:

a. Decentralized scheme: coordination among different base stations/cells in the network is not required. One possible method in this class is to limit the UE transmit power relative to the thermal noise depending on its distance to the base station in that cell. For instance, the distance can be determined from the measured received power or from using a distance or location estimator algorithm. While this cannot guarantee that each UE will see minimum amount of inter-cell interference, it certainly guarantees that the amount of inter-cell interference is bounded.

b. Centralized scheme: coordination among different base stations/cells in the network is required via a network resource manager such as radio network controller (RNC) for WCDMA network or its substitute for other network architectures. In a full-IP network, the substitute could be an RNC-Lite or a certain base station that is assigned to be the resource manager for a network of multiple base stations. In this case, the network resource manager performs a joint optimization or control which assigns the transmit power for each of the UEs in the network to ensure that each of the UEs sees minimum amount of inter-cell interference. Since the power control is slow, this method is feasible at the expense of increased complexity in the network protocol compared to the decentralized scheme.

c. Cooperative scheme: instead of coordination among different base stations/cells, two or more base stations in the network can communicate and cooperate with one another to adjust their transmit powers based upon their inter-cell interference measurements. For instance, if one base station detects too much interference from the neighboring cells, it can ask the neighboring base stations to lower the uplink powers in their cells. This can also be done for multiple sectors within the same or different cells.

After the base station determines the UE transmit power, it sends a command to each of the scheduled UEs to increase, decrease, or maintain its transmit power, 350. This can be done in many ways:

a. A dedicated downlink channel is used to send the slow power control command. Depending on the number of bits in the power control codeword, different power control increment may result. For example, with 1-bit codeword, the base station can only command the UE to increase or decrease its power by XdB, where X can be any number. A 3-level command can also be issued (increase, decrease, no change). In general, with N bits, $2^N$ power levels can be used.

b. The slow power control command is sent (fed back) via an existing downlink channel. For example, this channel can be the downlink shared control channel used to provide scheduling grants to user equipments for uplink transmission. The power control codeword may be included in the downlink shared control channel at a rate that is much slower than the transmission time interval (TTI) duration over which the downlink shared control channel is typically transmitted. In other words, the power control codeword may be included in the downlink shared control channel once every many (for example, hundreds) transmissions of that channel. The feedback rate can be related to the averaging length of deriving the long-term metric from the short-term metric. Alternatively, if finer power adaptation (large number of possible power level increment/decrement) is desired, the feedback rate may be somewhat higher but the number of bits per feedback may be made smaller.

Yet another alternative is to send the command via some higher layer signaling instead of using the downlink physical channel resource. This may be feasible since the long term channel statistics should vary slowly.

At 360, depending on the slow power control command from the base station, the UE adjusts its transmit power accordingly. Note that the adaptation/adjustment rate is low due to the nature of the channel statistics. The method ends at 370.

Many modifications and other embodiments of the invention will come to mind to one skilled in the art to which this invention pertains having the benefit of the teachings presented in the foregoing descriptions, the associated drawings, and claims. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. For example, although the disclosed method is described for systems employing orthogonal multiple access schemes including those providing super-orthogonality, its application to systems employing non-orthogonal or quasi-orthogonal multiple access schemes should not be precluded. In this case, the systems may opt to perform slow power control regardless the potentially faster interference variation due to intra-cell interference. That is, the system is only interested in controlling the long-term behavior of the total interference.

What is claimed is:

1. A method for slow uplink power control of signal transmissions from user equipments in communication systems, said method comprising:
    measuring at least one uplink channel metric for at least one user equipment from a plurality of user equipments;
    using a control metric derived from at least one uplink channel metric for at least one user equipment;
    determining a transmit power for at least one user equipment using at least one criterion, said determining is based upon the control metric; and
    transmitting a power control command to at least one user equipment using a downlink control channel shared among multiple user equipments, wherein the transmission of the power control command to at least one user equipment is at a rate that is slower than a transmission time interval (TTI).

2. A network element of a wireless communication system, said network element is coupled to an uplink channel and said network element configured to provide slow uplink power control responding to a control metric that is derived from filtering an uplink channel metric over a plurality of transmission instances and a set of performance criteria, wherein said network element transmits a power control command to at least one user equipment using a downlink control channel shared among multiple user equipments, wherein the transmission of the power control command to at least one user equipment is at a rate that is slower than a transmission time interval (TTI).

3. The network element of claim 2, wherein the wireless communication system employs an orthogonal multiple access scheme.

4. The network element of claim 3, wherein the orthogonal multiple access scheme is orthogonal frequency division multiple access (OFDMA).

5. A computer-readable medium encoded with one or more sequences of instructions for slow uplink power control, wherein execution of the one or more sequences of instructions by one or more processors causes the one or more processors to perform the steps of:
    measuring at least one uplink channel metric for at least one user equipment from a plurality of user equipments;
    filtering the at least one uplink channel metric over a plurality of transmission instances to obtain a control metric;
    determining a transmit power for at least one user equipment using a set of performance criteria, said determining is based both upon the control metric and the set of performance criteria; and
    transmitting a power control command to at least one user equipment using a downlink control channel shared among multiple user equipments, wherein the transmission of the power control command to at least one user equipment is at a rate that is slower than a transmission time interval (TTI).

6. The computer-readable medium of claim 5, wherein the slow uplink power control is employed in a wireless communication system using an orthogonal multiple access scheme.

7. The computer-readable medium of claim 5, wherein the orthogonal multiple access scheme is orthogonal frequency division multiple access (OFDMA).

8. The method of claim 1, wherein the communication system is an IEEE 802.16e system.

9. The method of claim 1, wherein the communication system is a WIMAX system.

10. The method of claim 1, wherein the communication system is a WiBro system.

11. User equipment comprising:
    a receiver configured to receive a slow power control command generated in accordance with claim 1; and
    a processor for processing the slow power command.

12. The network element of claim 3, wherein the orthogonal multiple access scheme is single-carrier orthogonal division multiple access (SC-FDMA).

13. The computer-readable medium of claim 5, wherein the orthogonal multiple access scheme is single-carrier orthogonal division multiple access (SC-FDMA).

14. The method of claim 1, wherein the rate of the transmission of the power control command is once every many transmissions of the downlink shared control channel.

15. The method of claim 2, wherein the rate of the transmission of the power control command is once every many transmissions of the downlink shared control channel.

16. The method of claim 5, wherein the rate of the transmission of the power control command is once every many transmissions of the downlink shared control channel.

* * * * *

UNITED STATES PATENT AND TRADEMARK OFFICE
CERTIFICATE OF CORRECTION

PATENT NO. : 7,668,564 B2  Page 1 of 1
APPLICATION NO. : 11/425202
DATED : February 23, 2010
INVENTOR(S) : Onggosanusi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 760 days.

Signed and Sealed this

Twenty-eighth Day of December, 2010

David J. Kappos
*Director of the United States Patent and Trademark Office*